Aug. 26, 1969  L. B. COURTOT ET AL  3,463,517
HOSE COUPLING HAVING CLAMP POSITIONING MEANS
Filed May 7, 1968
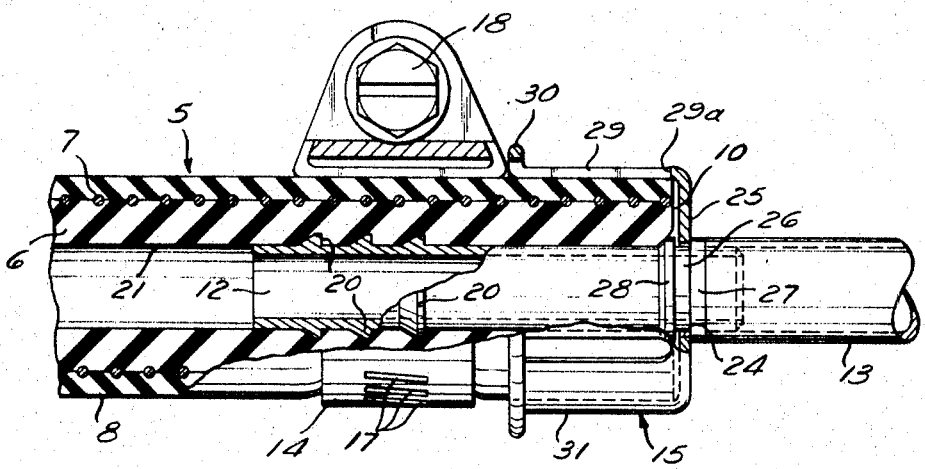
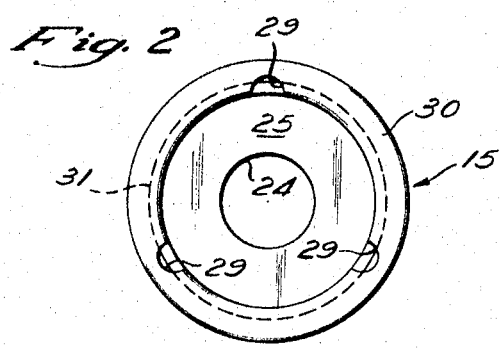
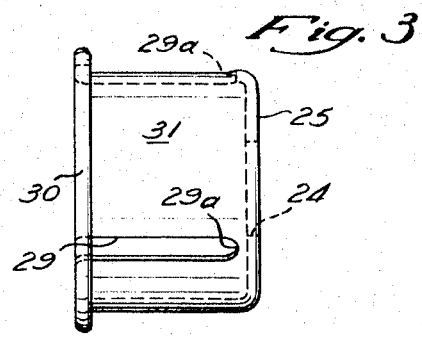
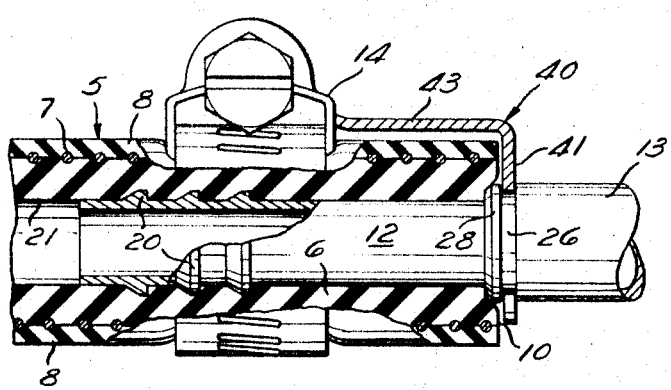
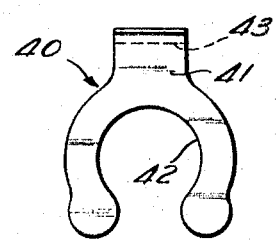
INVENTORS
LOUIS B. COURTOT,
JAMES R. JEROMSON,
& PHILIP W. MORSE
BY
McNENNY, FARRINGTON, PEARNE, & GORDON
R. H. Dickinson Jr.
ATTORNEYS United States Patent Office 3,463,517
Patented Aug. 26, 1969

3,463,517
HOSE COUPLING HAVING CLAMP
POSITIONING MEANS
Louis B. Courtot, Euclid, James R. Jeromsom, Jr.,
Willoughby, and Philip W. Morse, Cleveland
Heights, Ohio, assignors to The Weatherhead Company, a corporation of Ohio
Filed May 7, 1968, Ser. No. 727,315
Int. Cl. F16l 55/00, 35/00
U.S. Cl. 285—93    4 Claims

ABSTRACT OF THE DISCLOSURE

A reusable hose end assembly includes a tubular nipple having a major portion thereof inserted within the end of a length of hose, an adjustable clamp engaging the outer wall of the hose at an optimum position, and a cup-like cap snugly fitting over the cut end of the hose. The cap is constructed so that it provides a gauge for the optimum positioning of the clamp and provides windows through the wall thereof which facilitate the use of the hose end assembly.

BACKGROUND OF THE INVENTION

This invention relates generally to a hose end assembly which includes a nipple received within the cut end of the hose and an adjustable clamp surrounding the exterior of the hose and a device which serves a number of functions such as locating the clamp in an optimum position and, at the same time, covers and protects the cut end of the hose and, at the same time, provides elongated openings for windows for visual inspection showing the correct positioning of the hose within the said device.

The construction and arrangement of the parts is such that human error in applying the hose end assembly is minimized.

PRIOR ART

Numerous variations of hose end assemblies having nipples and surrounding clamps and end caps are found in the prior art. Many of such prior art devices have provided some of the functions accomplished by the invention of the instant application. Such prior art devices, however, required considerable skill in placing the surrounding clamp in an optimum position with respect to the nipple. Many of the prior art devices had included protective caps for the cut end of the hose which had little or no cooperative relationship with respect to the clamp surrounding the hose so that considerable skill on the part of the user was required in making an effective leak-proof coupling of the hose and the hose end assembly.

The applicant's invention here solves the problem of placing the external clamp on the hose at an optimum position with respect to the nipple by unskilled users. This is accomplished by constructing an end cap which has a continuously circumferential flange which functions as a gauge to be brought into contact with the external clamp.

SUMMARY OF THE INVENTION

The preferred embodiment of the present invention includes a cup-like member of molded plastic material having a central bore in that portion of the member which may be referred to as the bottom of the cup. The plastic material employed is such that a central bore in the bottom of the cup snaps into position between shoulders on the nipple in that portion of the nipple outside of the hose. The walls of the cup-like member are provided with elongated openings which not only provide visual inspection of the relationship between the hose and cup, but which facilitate the use of tools for removing the end of the hose from the cup. Other advantages will appear as the description proceeds.

OBJECTS OF THE INVENTION

It is an object of the present invention to provide an improved hose end assembly characterized by low-cost manufacture, efficiency in operation and which minimizes the need for skill in assembly and disassembly.

It is a further object of the present invention to provide an assembly according to the preceding object wherein a plastic end cap is formed in a cup-like shape with a flange at the rim of the cup, windows in the side wall of the cup, a snap-on fit between a bore in the bottom of the cup and peripheral ribs at the exterior of the nipple.

Further objects and advantages will appear from the following description and the drawings.

BRIEF DESCRIPTION OF THE DRAWINGS

FIGURE 1 is an elevation of the hose end assembly of the present invention as applied to the end of a length of hose with parts of the assembly in section;

FIGURE 2 is an end view of the cup-like plastic cap looking into the open end thereof which is fitted over the cut end of the hose;

FIGURE 3 is a side elevation of the plastic cup member;

FIGURE 4 is an elevation similar to FIGURE 1 illustrating a plastic member constructed and arranged to perform some of the functions of the plastic cup shown in FIGURES 1 to 3; and FIGURE 5 is an end view of the plastic member utilized in the modification of FIGURE 4.

DESCRIPTION OF THE INVENTION

Referring to the drawings in greater detail, a piece of flexible hose indicated in its entirety as at 5, comprises an inner tubular rubber liner 6, a braided reinforcing layer 7 and an abrasion resistant rubber cover 8. It will be understood that hose of this type is made in long extended lengths which are cut as desired to expose the end of the hose as indicated at 10 so that all three layers are exposed at this cut end. The braid construction allows a considerable amount of radial expansion, and the outer rubber cover may be omitted if not required for protective purposes.

The hose end assembly consists of a tubular metal nipple 12 secured to a metal pipe 13, together with a hose clamp 14 and a cup-like plastic cap 15. The clamp 14 may be of any type although the screw adjustable band type is shown by way of example because of its wide use and popularity. It is understood that other types such as a spring wire hose clamp may be used, and optionally under low pressure conditions the hose clamp may be dispensed with if it is not required by environmental conditions.

As shown, the band type hose clamp has the advantage that it applies pressure over a considerable longitudinal length of the hose, and it is provided with inclined serrations 17 which function as threads with respect to the threads formed on the shank of the threaded fastener 18. It will be understood that with the band of the clamp 14 in position surrounding the hose, the member 18 may be turned so as to tighten the band on the hose. The nipple 12 is preferably provided with circumferentially continuous ribs 20. These ribs 20 are preferably shaped with sloping faces on the outer side which aid in the penetration of the nipple 12 within the bore 21 of the hose 5. These ribs 20 also have relatively steep reverse faces which aid in retaining the hose in place on the nipple, even in the absence of the clamp 14.

The term "optimum position" as used herein means that the adjustable clamp 14 is spaced from the end face 10 of the hose so that the clamp 14 compresses the hose in the area of the ribs 20 so as to exert a maximum of sealing pressure between the nipple and the hose.

The cap 15 is preferably formed of a moldable plastic material such as nylon, polyester composition or polypropylene. The cap is preferably formed by injection molding and has a flat end wall 25 with a circular opening 24 therein of such a diameter as to fit in the groove 26 formed on the nipple or the pipe by a pair of axially spaced shoulders 27 and 28. The cap material and dimensions are chosen so as to be sufficiently flexible so as to allow the end wall 25 to be sprung or temporarily deformed so as to snap over the outer shoulder 28 so that the cap is then snugly retained in the groove 26. Of course, the shoulders and groove may be formed either on the nipple 12 or the pipe 13 or at the junction between them as desired.

The cap has a generally cylindrical tubular skirt portion 31 extending axially from the end wall 25 to terminate in an outwardly extending flange or bead 30. The skirt 31 is molded with slots or windows 29 which extend axially to terminate at an end 29a adjacent the end wall 25. These slots 29 may be several in number and are preferably spaced equidistantly about the periphery. Since the slots extend adjacent the end wall 25, they expose the surface of the hose up to the end 10.

During assembly of the hose on the nipple, this allows visual inspection to ensure that the nipple is inserted into the bore for the full depth so that the cut end 10 is adjacent the cap end wall 25 and rib 28. By proper shape of the die, it will be seen that the molding of the cap is simple by the use of a male die having external ribs to form the slot and by the use of the peripheral bead or flange 30, these slots in effect extend axially through the flange which is therefore circumferentially continuous on its outer edge only by that amount by which its radial thickness exceeds the thickness of the skirt portion 31.

When the hose is assembled on the hose end assembly, it is pressed onto the nipple past the ribs 20 until further movement is prevented by the contact between the cut end 10 of the hose and either the cap end wall 25 or the rib 28. While it is possible to determine that assembly has been completed by the increase in resistance to the advance of the hose onto the nipple and cup assembly, a simple visual inspection through the slot 29 will allow determination of completion of the assembly operation.

After the hose and coupling have been so assembled, then optionally the hose clamp may be applied to the hose. The length of the skirt portion 31 is such that the bead 30 is located adjacent the ribs 20. Thus, by positioning the clamp adjacent the bead 30, the clamp is properly positioned to overlie the ribs in the desired clamping position for maximum effectiveness.

Because the skirt portion 31 is substantially continuous and the bead 30 serves to secure the free ends away from the end wall 25 together in rigid relationship, the cap provides an effective protection for the hose end to prevent fraying of the braid assembly at the cut end 10, a problem that is particularly pronounced where no external rubber covering is used and the braid is exposed.

In the event the hose end assembly is to be reused by replacement of the hose, the disassembly is facilitated by the slots 29. Disassembly may be made quite easily by cutting the hose axially to thereby free the grip of the ribs 20 after the hose clamp has been removed. Because the skirt portions 31 of the cap are secured together circumferentially only by the outermost portion of the bead 30 overlying the slots 29, the cap at this point is easily cut to allow the hose beneath the cap to be cut all the way back from the cut end 10 to a point outward of the ribs 20. When this is done, the hose is easily removed and the plastic cap can then be cut off the nipple and tube and easily be replaced by a new cap which snaps into position. Of course, it is also possible to reuse the rap if the cap is not cut through at the bead 30 by using a knife that can effect the necessary cutting of the window 29 and continue this cut outward beyond the bead 30 overlying the ribs 20. However, it is recognized that because of the low cost of the plastic cap and the difficulty of cutting the hose completely without cutting through the bead 30, the saving in time does not usually warrant the alternative method in which the cap is not destroyed.

In that form of the invention illustrated in FIGURES 4 and 5, the nipple 12 and adjustable clamp 14 are constructed and arranged to operate as in the embodiment of FIGURE 1. In this form of the invention, however, the plastic cap is replaced with a right-angled plastic gauge device 40. The depending end portion 41 of the gauge 40 is provided with a re-entrant opening 42 which may be snapped into the space 26 on the nipple. The horizontally disposed portion 43 of the gauge 40 is parallel to the outer wall of the hose and serves to locate the clamp 14 at its optimum position along the nipple.

It will be appreciated by those skilled in the hose end assembly art that numerous modifications may be made in the invention without departing from the scope of the invention.

What is claimed is:

1. A hose end assembly comprising an elongated tubular nipple having a plurality of annular ribs at the exterior thereof, said nipple being proportioned with respect to the inner diameter of the hose so that the diameter of the ribs exceeds the inner diameter of the hose and wherein said ribs are spaced axially from the cut end face of the hose when the nipple is inserted therein, a plastic cup having a bottom wall defining an opening to receive the nipple and positioned to extend adjacent the cut end face of the hose, said cup having a peripheral side wall extending axially from said bottom wall over the outer surface of said hose, said side wall terminating at the end away from said bottom wall in a radially extending annular bead of greater radial thickness than the radial thickness of said side wall, a hose clamp secured on said hose in axial alignment with and surrounding said annular ribs on said nipple immediately adjacent said bead, the beaded end of said cup abutting against one end of said clamp to provide a gauge for optimum positioning of the clamp with respect to the ribs on said nipple, said side wall being provided with an opening extending axially from said bead to said bottom wall to provide visual inspection of the relative positions of said hose end face and said bottom wall, stop means on the tubular nipple to axially position the cup on said nipple.

2. A hose end assembly as set forth in claim 1 wherein said stop means comprises an annular groove on said nipple to cooperate with said bottom wall opening of said cup to retain said cup in a predetermined axial position on said nipple.

3. A hose end assembly set forth in claim 1 wherein said cup side wall is provided with a plurality of identical openings arranged equidistantly about the peripheral extent of said side wall.

4. A hose end assembly as set forth in claim 1 wherein said bead at the points in axial alignment with said opening has a reduced radial thickness with the outer surface of said bead at said opening having substantially the same outer diameter as the remaining portions of said bead.

References Cited

UNITED STATES PATENTS

| | | | |
|---|---|---|---|
| 713,117 | 11/1902 | Lee | 285—243 |
| 1,212,817 | 1/1917 | Russell | 285—253 X |
| 1,486,421 | 3/1924 | Dyer | 285—243 |
| 2,208,706 | 7/1940 | Spencer | 285—253 |
| 3,262,721 | 7/1966 | Knight. | |
| 3,272,536 | 9/1966 | Weinhold | 285—243 X |
| 3,365,218 | 1/1968 | Denyes | 285—253 |
| 3,389,442 | 6/1968 | Tetzlaff | 24—278 |

FOREIGN PATENTS

| | | |
|---|---|---|
| 1,267,697 | 6/1961 | France. |
| 378,340 | 8/1932 | Great Britain. |

THOMAS F. CALLAGHAN, Primary Examiner

U.S. Cl. X.R.

285—253